United States Patent
Das

(10) Patent No.: US 11,455,573 B2
(45) Date of Patent: Sep. 27, 2022

(54) DATA PROTECTION DISTRIBUTED LEARNING

(71) Applicant: International Business Machines Corporation, Armonk, NY (US)

(72) Inventor: Subhro Das, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 518 days.

(21) Appl. No.: 16/588,456

(22) Filed: Sep. 30, 2019

(65) Prior Publication Data

US 2021/0097430 A1  Apr. 1, 2021

(51) Int. Cl.
*G06F 15/16* (2006.01)
*G06N 20/00* (2019.01)
*G06F 21/62* (2013.01)

(52) U.S. Cl.
CPC ......... *G06N 20/00* (2019.01); *G06F 21/6218* (2013.01)

(58) Field of Classification Search
CPC ............................. G06N 20/00; G06F 21/6218
USPC ........................................................ 709/200
See application file for complete search history.

(56) References Cited

U.S. PATENT DOCUMENTS

| | | | | |
|---|---|---|---|---|
| 1,063,082 | A * | 5/1913 | Thomas, Sr. et al. | F01L 7/00 123/188.5 |
| 10,205,728 | B2 * | 2/2019 | Carnahan | H04L 63/102 |
| 10,389,607 | B1 * | 8/2019 | Borovikov | H04L 67/22 |
| 10,419,440 | B2 * | 9/2019 | Carnahan | G06K 9/6259 |
| 10,460,370 | B2 * | 10/2019 | Borovikov | H04L 9/00 |
| 10,534,928 | B1 * | 1/2020 | Roden | G06F 21/6281 |
| 10,880,192 | B1 * | 12/2020 | Borovikov | H04L 43/06 |
| 11,126,167 | B2 * | 9/2021 | SayyarRodsari | H04L 63/00 |
| 2005/0216941 | A1 * | 9/2005 | Flanagan | H04N 21/4143 725/112 |
| 2014/0088989 | A1 | 3/2014 | Krishnapuram et al. | |
| 2017/0293857 | A1 | 10/2017 | Stajner | |
| 2018/0018590 | A1 | 1/2018 | Szeto et al. | |

(Continued)

FOREIGN PATENT DOCUMENTS

| | | |
|---|---|---|
| CN | 108717514 A | 10/2018 |
| CN | 106209457 B | 3/2019 |

OTHER PUBLICATIONS

Mcmahan et al., Communication-Efficient Learning of Deep Networks from Decentralized Data, Feb. 28, 2017, 11 Pages.

(Continued)

*Primary Examiner* — Moustafa M Meky
(74) *Attorney, Agent, or Firm* — Amin, Turocy & Watson, LLP

(57) ABSTRACT

Systems, computer-implemented methods, and computer program products to facilitate data protection distributed learning are provided. According to an embodiment, a system can comprise a memory that stores computer executable components and a processor that executes the computer executable components stored in the memory. The computer executable components can comprise a local parameter component that employs an agent to compute local model parameters based on data of the agent. The computer executable components can further comprise a global parameter component that employs the agent to estimate a global model parameter based on the local model parameters and model parameters of one or more neighbor agents.

20 Claims, 10 Drawing Sheets

(56) References Cited

U.S. PATENT DOCUMENTS

| | | | |
|---|---|---|---|
| 2018/0276632 A1* | 9/2018 | Gandevia | G06Q 30/08 |
| 2018/0285951 A1* | 10/2018 | Borovikov | G06Q 30/0619 |
| 2018/0302498 A1 | 10/2018 | Xie et al. | |
| 2018/0337927 A1* | 11/2018 | Carnahan | H04L 63/0876 |
| 2019/0173889 A1* | 6/2019 | Carnahan | G06N 20/00 |
| 2020/0103858 A1* | 4/2020 | SayyarRodsari | G05B 19/4183 |
| 2020/0120101 A1* | 4/2020 | Carnahan | H04L 63/0876 |
| 2020/0364072 A1* | 11/2020 | Raja Jayraman | G06F 8/61 |

OTHER PUBLICATIONS

Moemeng et al., Agent-based distributed data mining: A survey, Chapter 3, Data Mining and Multiagent Integration, 2009, 12 Pages.

Chong, Forty years of distributed estimation: A review of noteworthy developments, IEEE SDF, 2017, 10 Pages.

Das et al., Distributed Kalman Filtering with Dynamic Observation Consensus, IEEE Transactions on Signal Processing, Sep. 1, 2015, 16 Pages.

Das et al., Consensus+Innovations Distributed Kalman Filter with Optimized Gains, IEEE, Oct. 13, 2016, 15 Pages.

Lian et al., Can decentralized algorithms outperform centralized algorithms? A case study for decentralized parallel stochastic gradient descent, NIPS 2017, 11 Pages.

Distributed Sensing Systems Group, CSIRO Australia: Developed example prototypes of distributed applications over sensor networks, Last accessed Aug. 13, 2019, 2 Pages.

Xiao et al., Fast linear iterations for distributed averaging Science Direct, Elsevier, Systems & Control Letters, Feb. 25, 2004, pp. 65-78.

Mcmahan et al., Federated Learning: Collaborative Machine Learning without Centralized Training Data, Apr. 6, 2017, 3 Pages.

Mel, et al., The NIST Definition of Cloud Computing, National Institute of Standards and Technology Special Publication 800-145, Sep. 2011, 7 Pages.

* cited by examiner

DATA PROTECTION DISTRIBUTED LEARNING

BACKGROUND

The subject disclosure relates to distributed learning, and more specifically, to data protection distributed learning.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate data protection distributed learning are described.

According to an embodiment, a system can comprise a memory that stores computer executable components and a processor that executes the computer executable components stored in the memory. The computer executable components can comprise a local parameter component that employs an agent to compute local model parameters based on data of the agent. The computer executable components can further comprise a global parameter component that employs the agent to estimate a global model parameter based on the local model parameters and model parameters of one or more neighbor agents.

According to another embodiment, a computer-implemented method can comprise employing, by a system operatively coupled to a processor, an agent to compute local model parameters based on data of the agent. The computer-implemented method can further comprise employing, by the system, the agent to estimate a global model parameter based on the local model parameters and model parameters of one or more neighbor agents.

According to another embodiment, a computer program product that can facilitate data protection distributed learning is provided. The computer program product can comprise a computer readable storage medium having program instructions embodied therewith, the program instructions can be executable by a processing component to cause the processing component to employ, by the processor, an agent to compute local model parameters based on data of the agent. The program instructions can further cause the processing component to employ, by the processor, the agent to estimate a global model parameter based on the local model parameters and model parameters of one or more neighbor agents.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A problem with existing distributed learning technologies (e.g., federated learning, edge computing, etc.) is that protection of data and/or computation-communication resources of various sources is not maintained when implementing prediction and/or insight generation engines. In such existing distributed learning technologies, data and/or computation-communication resources of various sources are distributed across different agents (e.g., local worker nodes) of a distributed learning network and/or model parameters shared with a centralized fusion center (e.g., a centralized fusion server).

Given the above problem with current distributed learning technologies sharing such data and/or computation-communication resources with agents of a distributed learning network and/or model parameters with a centralized fusion center, the present disclosure can be implemented to produce a solution to this problem in the form of systems, computer-implemented methods, and/or computer program products that can provide and/or implement a data protection distributed learning network for predictive models where: a) each agent in the network only uses its own local and private data to compute the local parameters for a learning task; b) each agent in the network aggregates model parameters from its neighbors locally to obtain an estimate of the global parameter in a peer-to-peer network fashion; c) each agent in the network shares its own local parameters and its estimate of the global parameter only with its own trusted neighbors, not with all agents or with a centralized fusion center; and/or d) asymptotically, after a few iterations, all agents in the network come to a consensus on the estimate of the global parameters (e.g., global parameters that could have only been computed if all the data were in one place).

Figure 1:
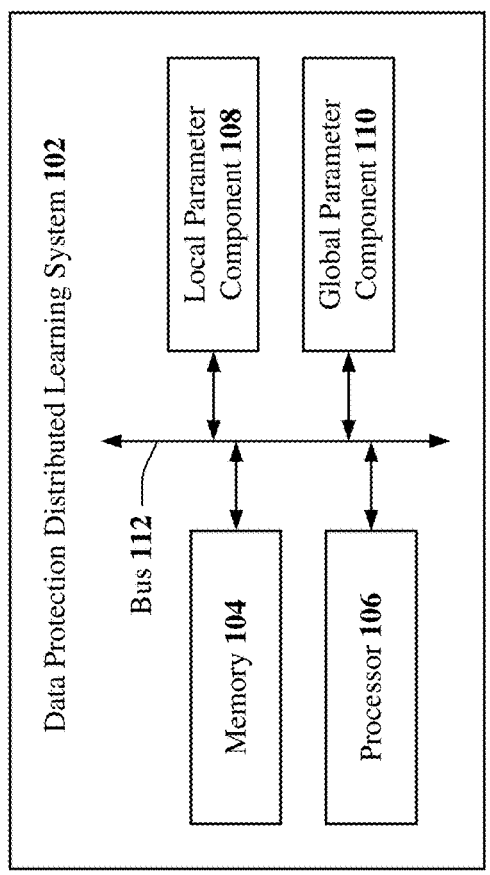
FIG. 1 illustrates a block diagram of an example, non-limiting system that can facilitate data protection distributed learning in accordance with one or more embodiments described herein.

FIG. 1 illustrates a block diagram of an example, non-limiting system 100 that can facilitate data protection distributed learning in accordance with one or more embodiments described herein. In some embodiments, system 100 can comprise a data protection distributed learning system 102, which can be associated with a cloud computing environment. For example, data protection distributed learning system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

In some embodiments, data protection distributed learning system 102 and/or components thereof (e.g., local parameter component 108, global parameter component 110, consensus component 402, etc.) can employ one or more computing resources of cloud computing environment 950 described below with reference to FIG. 9 and/or one or more functional abstraction layers described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.) and/or one or more quantum computing devices (e.g., quantum computer, quantum processor, quantum circuit simulation software, superconducting circuit, etc.) that can be employed by data protection distributed learning system 102 and/or components thereof to execute one or more operations in accordance with one or more embodiments of the subject disclosure described herein. For instance, data protection distributed learning system 102 and/or components thereof can employ such one or more classical and/or quantum computing devices to execute one or more mathematical functions and/or equations, one or more computing and/or processing scripts, one or more models (e.g., artificial intelligence (AI) models, machine learning (ML) models, etc.), one or more classical and/or quantum algorithms, and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1. According to several embodiments, data protection distributed learning system 102 can comprise a memory 104, a processor 106, a local parameter component 108, a global parameter component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or data protection distributed learning system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to data protection distributed learning system 102, local parameter component 108, global parameter component 110, and/or another component associated with data protection distributed learning system 102 (e.g., consensus component 402, etc.), as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Data protection distributed learning system 102, memory 104, processor 106, local parameter component 108, global parameter component 110, and/or another component of data protection distributed learning system 102 as described herein can be communicatively, electrically, and/or operatively coupled to one another via a bus 112 to perform functions of system 100, data protection distributed learning system 102, and/or any components coupled therewith. In several embodiments, bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Data protection distributed learning system 102 can comprise any type of component, machine, device, facility, apparatus, and/or instrument that comprises a processor and/or can be capable of effective and/or operative communication with a wired and/or wireless network. All such embodiments are envisioned. For example, data protection distributed learning system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Data protection distributed learning system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, data protection distributed learning system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, data protection distributed learning system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, data protection distributed learning system 102 can thus include hardware (e.g., a central processing unit (CPU), a transceiver, a decoder, a quantum processor, etc.), software (e.g., a set of threads, a set of processes, software in execution, quantum pulse schedule, quantum circuit, etc.) or a combination of hardware and software that facilitates communicating information between data protection distributed learning system 102 and external systems, sources, and/or devices (e.g., computing devices, communication devices, etc.).

Data protection distributed learning system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with data protection distributed learning system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, local parameter component 108, global parameter component 110, and/or any other components associated with data protection distributed learning system 102 as disclosed herein (e.g., communicatively, electronically, operatively, and/or optically coupled with and/or employed by data protection distributed learning system 102), can comprise such computer and/or machine readable, writable, and/or executable component(s) and/or instruction(s). Consequently, according to numerous embodiments, data protection distributed learning system 102 and/or any components associated therewith as disclosed herein, can employ processor 106 to execute such computer and/or machine readable, writable, and/or executable component(s) and/or instruction(s) to facilitate performance of one or more operations described herein with reference to data protection distributed learning system 102 and/or any such components associated therewith.

Data protection distributed learning system 102 can facilitate performance of operations executed by and/or associated with local parameter component 108, global parameter component 110, and/or another component associated with data protection distributed learning system 102 as disclosed herein (e.g., consensus component 402, etc.). For example, as described in detail below, data protection distributed learning system 102 can facilitate via processor 106 (e.g., a classical processor, a quantum processor, etc.): employing an agent to compute local model parameters based on data of the agent; and/or employing the agent to estimate a global model parameter based on the local model parameters and model parameters of one or more neighbor agents. In some embodiments, such model parameters can comprise: second local model parameters computed based on second data of the one or more neighbor agents; and/or a second global model parameter estimated based on the local model parameters, the second local model parameters, and the global model parameter.

In some embodiments, data protection distributed learning system 102 can further facilitate via processor 106 (e.g., a classical processor, a quantum processor, etc.): employing the one or more neighbor agents to compute second local model parameters based on second data of the one or more neighbor agents, where such data of the agent can comprise local data on a restricted access database (RAD) of the agent and the second data of the one or more neighbor agents can comprise second local data on one or more second restricted access databases (RAD) of the one or more neighbor agents; employing the one or more neighbor agents to estimate a second global model parameter based on the local model parameters, the global model parameter, and the second local model parameters computed based on the second data of the one or more neighbor agents; estimating a consensus global model parameter based on multiple global model parameter estimates computed by employing at least one of the agent or the one or more neighbor agents; and/or employing the agent to perform at least one of transmitting only one or more model parameters to the one or more neighbor agents or receiving only the one or more model parameters from the one or more neighbor agents, thereby preventing direct sharing of at least one of the data of the agent or second data of the one or more neighbor agents and facilitating improved data protection of at least one of the data or the second data.

Local parameter component 108 can employ an agent to compute local model parameters based on data of the agent. For example, local parameter component 108 can employ an agent (also referred to as a worker, a learner, a predictor, etc.) of a distributed machine learning network used to implement a predictive model such as an artificial intelligence (AI) model, a machine learning (ML) model, and/or another predictive model. For instance, local parameter component 108 can employ an agent of a distributed machine learning network used to implement a machine learning model including, but not limited to, a synchronous machine learning model, an asynchronous machine learning model, a synchronous stochastic gradient descent machine learning model, an asynchronous stochastic gradient descent machine learning model, and/or another machine learning model.

The agent described above can comprise a computing device (e.g., server, computer, etc.) and/or computing software (e.g., virtual machine, computing application, computing threads, etc.) that can compute local model parameters (e.g., gradient weights, compressed gradient weights, etc.) of such a predictive model defined above based on data of the agent. For example, such an agent can comprise a local agent that can compute local model parameters of a predictive model based on local data stored on a restricted access database that can be accessed by the agent.

The agent described above can comprise and/or employ a local learning module (LLM) and/or one or more protocols, algorithms, and/or mathematical equations associated therewith to compute local model parameters of such a predictive model defined above. For example, such an agent can comprise and/or employ an LLM (e.g., sensing, model updates, data logging, etc.) and/or one or more protocols, algorithms, and/or mathematical equations associated therewith to compute local model parameters of one or more of the machine learning models defined above.

Local parameter component 108 can employ one or more neighbor agents to compute second local model parameters based on second data of the one or more neighbor agents. For example, local parameter component 108 can employ one or more neighbor agents comprising local and/or trusted neighboring agents of the agent described above.

The one or more neighbor agents described above can comprise one or more computing devices (e.g., server, computer, etc.) and/or computing software (e.g., virtual machine, computing application, computing threads, etc.) that can compute second local model parameters of a predictive model defined above based on second data of the one or more neighbor agents. For example, such one or more neighbor agents can comprise local and/or trusted neighboring agents of the agent described above that can each respectively compute their own local model parameters of such a predictive model defined above based on local data corresponding respectively to each of the one or more neighboring agents. In this example, such local data corresponding respectively to each of the one or more neighboring agents can be stored on one or more restricted access databases that can be accessed respectively by the one or more neighbor agents. In some embodiments, such local data of one neighbor agent of the one or more neighbor agents can be different from that of another neighbor agent of the one or more neighbor agents. In some embodiments, such local data of the one or more neighbor agents can be different from that of the agent described above.

The one or more neighbor agents described above can each comprise and/or employ a local learning module (LLM) and/or one or more protocols, algorithms, and/or mathematical equations associated therewith to respectively compute local model parameters of such a predictive model defined above. For example, such one or more neighbor agents can each comprise and/or employ a discrete LLM (e.g., sensing, model updates, data logging, etc.) and/or one or more protocols, algorithms, and/or mathematical equations associated therewith to respectively compute their own local model parameters corresponding to one or more of the machine learning models defined above.

Global parameter component 110 can employ an agent to estimate a global model parameter based on local model parameters of the agent and model parameters of one or more neighbor agents. For example, global parameter component 110 can employ the agent described above to estimate a global model parameter (e.g., global target variable(s) and/or state) of a predictive model (e.g., an AI model, ML model, etc.) based on local model parameters that can be computed by the agent as described above and model parameters that can be computed by at least one of the one or more neighbor agents described above. To facilitate estimation of the global model parameter, the agent can employ equation 302 and/or equation 304 described below with reference to FIG. 3 and the model parameters of the one or more neighbor agents, which can comprise: second local model parameters computed based on second data of the one or more neighbor agents; and/or a second global model parameter estimated based on the local model parameters, the second local model parameters, and the global model parameter. For example, such model parameters of the one or more neighbor agents can comprise: second local model parameters computed by at least one of the one or more neighbor agents as described above based on corresponding local data of such a neighbor agent(s); and/or a second global model parameter estimated by at least one of the one or more neighbor agents based on the local model parameters computed by the agent, the second local model parameters computed by the at least one neighbor agent, and the global model parameter computed by the agent.

Global parameter component 110 can employ the one or more neighbor agents to estimate the second global model parameter based on the local model parameters, the global model parameter, and the second local model parameters computed based on the second data of the one or more neighbor agents. For example, global parameter component 110 can employ at least one of the one or more neighbor agents to estimate the second global model parameter based on the local model parameters computed by the agent as described above, the global model parameter estimated by the agent as described above, and second local model parameters computed by the at least one of the one or more neighbor agents as described above based on corresponding local data of such a neighbor agent(s). To facilitate estimation of the second global model parameter described above, the at least one of the one or more neighbor agents can employ equation 302 and/or equation 304 described below with reference to FIG. 3.

Figure 2:
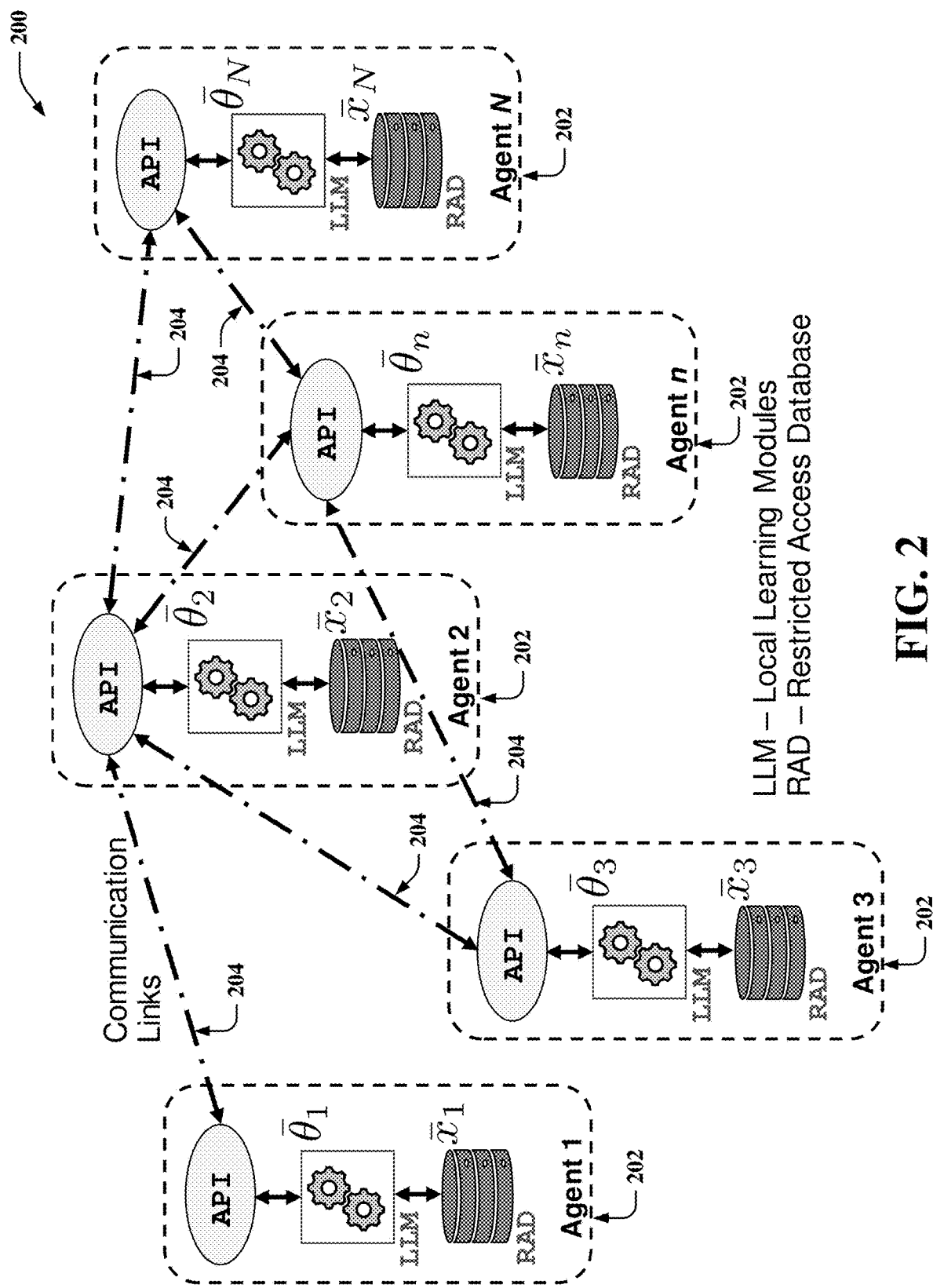
FIG. 2 illustrates a diagram of an example, non-limiting system that can facilitate data protection distributed learning in accordance with one or more embodiments described herein.

FIG. 2 illustrates a diagram of an example, non-limiting system 200 that can facilitate data protection distributed learning in accordance with one or more embodiments described herein. Repetitive description of like elements and/or processes employed in various embodiments described herein is omitted for sake of brevity.

System 200 can comprise a multi-agent network such as, for instance, a data protection distributed learning network that can be implemented in accordance with one or more of the embodiments of the subject disclosure described herein. System 200 can comprise one or more agents 202 (denoted Agent 1, Agent 2, Agent 3, . . . , Agent n, . . . , Agent N in FIG. 2).

Agents 202 can comprise the agent and/or the one or more neighbor agents described above with reference to FIG. 1. For example, Agent n depicted in FIG. 2 can comprise the agent described above with reference to FIG. 1. In another example, Agents 1, 2, 3, and N depicted in FIG. 2 (where N can denote a total quantity of agents) can comprise the one or more neighbor agents described above with reference to FIG. 1.

Agents 202 (Agent 1, 2, 3, n, and N) can each comprise a restricted access database (RAD) that can store data of the agent. For example: Agent 1 can comprise an RAD that can store data of Agent 1; Agent 2 can comprise an RAD that can store data of Agent 2; Agent 3 can comprise an RAD that can store data $\bar{x}_3$ of Agent 3; Agent n can comprise an RAD that can store data $\bar{x}_n$ of Agent n; and/or Agent N can comprise an RAD that can store data $\bar{x}_N$ of Agent N.

Agents 202 (Agent 1, 2, 3, n, and N) can each comprise a local learning module (LLM) that can be utilized by the agent to compute local model parameters of a predictive model based on the data of the agent as described above with reference to FIG. 1. For example: Agent 1 can utilize the LLM of Agent 1 to compute local model parameters $\bar{\theta}_1$ of a predictive model based on data $\bar{x}_1$ of Agent 1; Agent 2 can utilize the LLM of Agent 2 to compute local model parameters $\bar{\theta}_2$ of a predictive model based on data $\bar{x}_2$ of Agent 2; Agent 3 can utilize the LLM of Agent 3 to compute local model parameters $\bar{\theta}_3$ of a predictive model based on data $\bar{x}_3$ of Agent 3; Agent n can utilize the LLM of Agent n to compute local model parameters $\bar{\theta}_n$ of a predictive model based on data $\bar{x}_n$ of Agent n; and/or Agent N can utilize the LLM of Agent N to compute local model parameters $\bar{\theta}N$ of a predictive model based on data $\bar{x}_N$ of Agent N.

Figure 3:
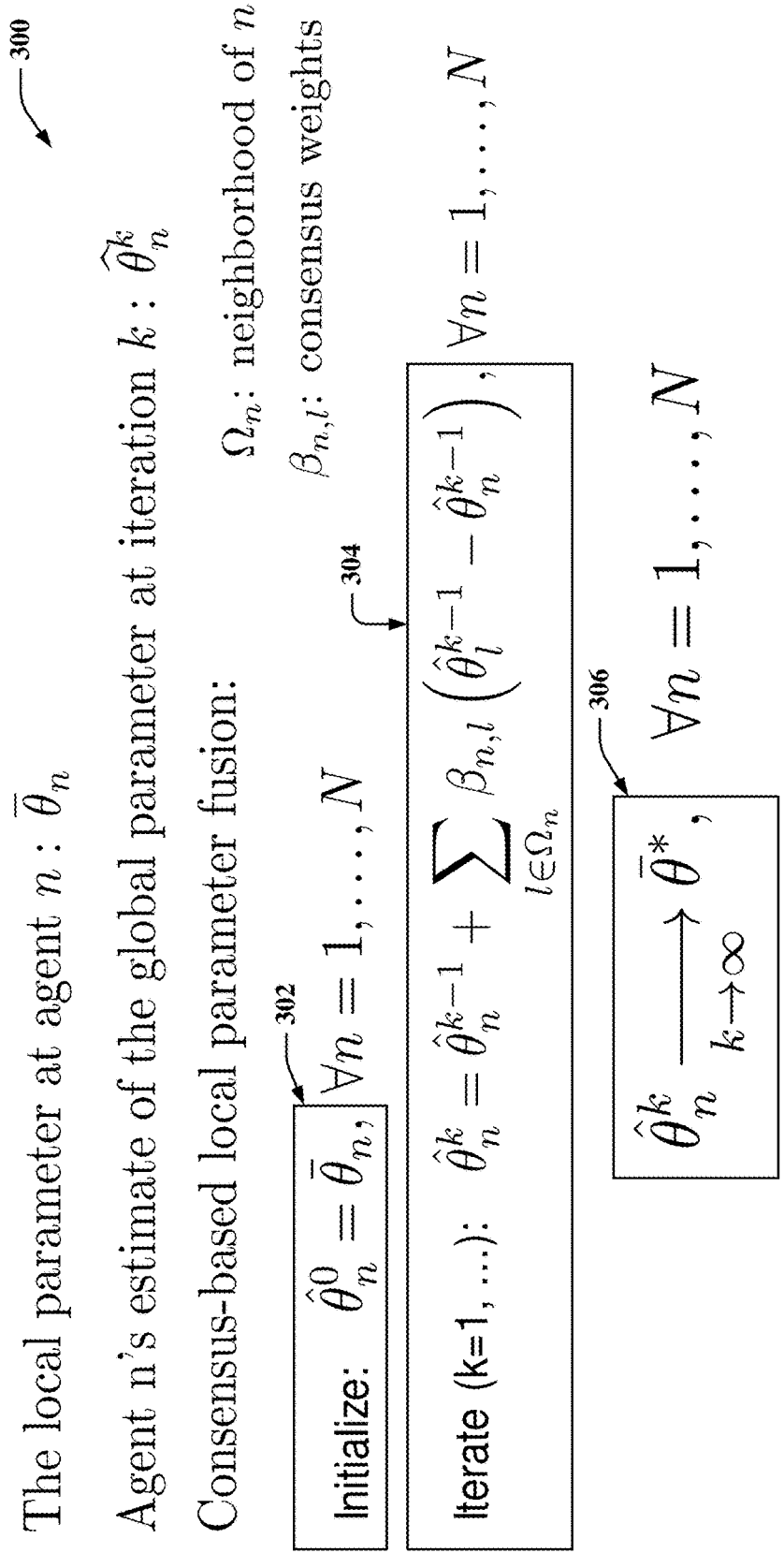
FIG. 3 illustrates example, non-limiting information that can facilitate data protection distributed learning in accordance with one or more embodiments described herein.

Agents 202 (Agent 1, 2, 3, n, and N) can each comprise an application programming interface (API) that can be utilized by the agent to communicate with and/or exchange information with one or more other agents 202 using communication links 204 as illustrated in FIG. 3. For example, agents 202 can each utilize their respective APIs to exchange (e.g., transmit and/or receive) information with one another, where such information can comprise only model parameters such as, for instance, local model parameters $\bar{\theta}_1, \bar{\theta}_2, \bar{\theta}_3, \bar{\theta}_n, \bar{\theta}_N$ and/or one or more global model parameter estimates computed by one or more agents of agents 202.

Communication links 204 can comprise one or more communication protocols that can be utilized by agents 202 (Agent 1, 2, 3, n, N) to communicate with on another and/or exchange information with one another. For example, communication links 204 can comprise one or more communication protocols including, but not limited to: single time-scale or two time-scales; networks and/or graphs such as, for instance, lattice (e.g., n-nearest neighbors), random (e.g., Erdos-Renyi, Watts-Strogatz), and/or preferential attachment (Barabasi-Albert); alternative protocols such as, for instance, Gossip communication protocol; and/or another communication protocol.

It should be appreciated that agents 202 of system 200 do not exchange their respective data with one another, thereby preventing direct sharing of the respective data of each of the agents 202 with each other and facilitating improved data protection of such data of each of the respective agents 202. For instance, agents 202 do not exchange data $\bar{x}_1, \bar{x}_2, \bar{x}_3, \bar{x}_n$, TN with one another. It should also be appreciated that system 200 can facilitate real-time model adaptation at each agent of agents 202 based on parameters received from collaborating agents (e.g., neighbor agents). For example, system 200 can facilitate: synchronous and/or asynchronous model updates; parameter fusion (e.g., via consensus algorithms); sampling distributed learning tasks (e.g., classification, regression, detection (e.g., hypothesis testing) for intervention timing and/or selection); a combination of multiple learning tasks; and/or real-time model adaptations at each agent of agents 202.

FIG. 3 illustrates example, non-limiting information 300 that can facilitate data protection distributed learning in accordance with one or more embodiments described herein. Repetitive description of like elements and/or processes employed in various embodiments described herein is omitted for sake of brevity.

As described above with reference to FIG. 1, global parameter component 110 can employ an agent to estimate a global model parameter and/or one or more neighbor agents to estimate one or more second global model parameters. To facilitate such estimations, the agent and/or the one or more neighbor agents can employ equation 302 and/or equation 304 illustrated in FIG. 3.

As depicted in FIG. 3, an agent n can employ equation 302 to initialize such an estimation of a global model parameter $\bar{\theta}^*$ by estimating the global model parameter at iteration k=0. For example, agent n can employ equation 302 to estimate the global model parameter at iteration k=0 based on (e.g., via inputting to equation 302) the local model parameters computed by agent n as described above with reference to FIG. 1 and the model parameters of the one or more neighbor agents 1 to N (denoted as 1, ..., N in FIG. 3), where such model parameters can be computed by the one or more neighbor agents 1 to N as described above with reference to FIG. 1.

As depicted in FIG. 3, agent n can employ equation 304 to estimate a global model parameter $\bar{\theta}^*$ via iteration by first estimating the global model parameter at iteration k=1. For example, agent n can employ equation 304 to estimate the global model parameter at iteration k=1 based on (e.g., via inputting to equation 304) the previous estimation of the global model parameter at iteration k=0 as computed by agent n, the previous estimation of the global model parameter at iteration k=0 as computed by an agent l of the one or more neighbor agents 1 to N, and consensus weights $\beta_{n,l}$ corresponding respectively to agent n and agent l of the one or more neighbor agents 1 to N as illustrated in FIG. 3. In some embodiments, such consensus weights $\beta_{n,l}$ can be defined and/or adjusted by consensus component 402 as described below with reference to FIGS. 4 and 5.

As illustrated by equation 306 depicted in FIG. 3, agent n and/or the one or more neighbor agents 1 to N (e.g., agent l), can employ equation 304 repeatedly from iteration k=1 to iteration k=infinity ($\infty$) to estimate a global model parameter $\bar{\theta}^*$. Such repeated iteration from iteration k=1 to iteration k=$\infty$ can facilitate convergence of the global model parameter estimations computed by agent n and/or the one or more neighbor agents 1 to N (e.g., agent l), to the global model parameter $\bar{\theta}^*$. For instance, such repeated iteration from iteration k=1 to iteration k=Go can facilitate asymptotic consensus of the global model parameter $\bar{\theta}^*$ by way of repeated global model parameter estimations computed by agent n and/or the one or more neighbor agents 1 to N (e.g., agent l).

Figure 4:
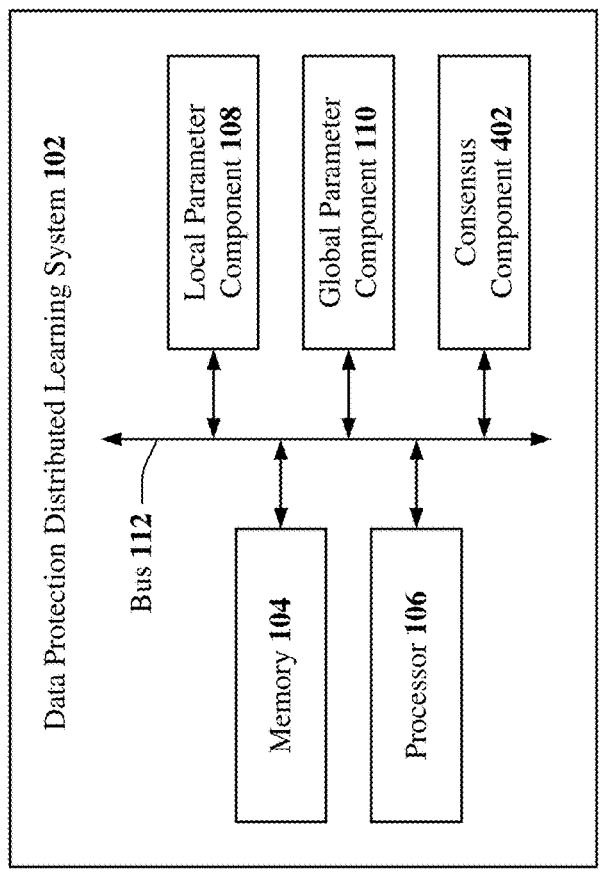
FIG. 4 illustrates a block diagram of an example, non-limiting system that can facilitate data protection distributed learning in accordance with one or more embodiments described herein.

FIG. 4 illustrates a block diagram of an example, non-limiting system 400 that can facilitate data protection distributed learning in accordance with one or more embodiments described herein. In some embodiments, system 400 can comprise data protection distributed learning system 102, which can comprise a consensus component 402. Repetitive description of like elements and/or processes employed in various embodiments described herein is omitted for sake of brevity.

Consensus component 402 can estimate a consensus global model parameter of a predictive model based on multiple global model parameter estimates. For example, consensus component 402 can estimate a consensus global model parameter of a predictive model based on multiple global model parameter estimates computed by global parameter component 110 by employing an agent and/or one or more neighbor agents of the agent. For instance, consensus component 402 can estimate a consensus global model parameter of a predictive model based on multiple global model parameter estimates computed by global parameter component 110 by employing an agent n and/or an agent l of the one or more neighbor agents of the agent.

To facilitate such an estimation of a consensus global model parameter, consensus component 402 can define and/or adjust one or more consensus weights $\beta_{n,l}$ of equation 304, where such consensus weights $\beta_{n,l}$ correspond respectively to an agent n and an agent l of the one or more neighbor agents. Based on such definition and/or adjustment of the one or more consensus weights $\beta_{n,l}$ of equation 304, agent n and/or agent l of the one or more neighbor agents can employ equation 304 and/or equation 306 as described above with reference to FIG. 3 to estimate the global model parameter $\bar{\theta}^*$ of a predictive model. Such a global model parameter $\bar{\theta}^*$ of a predictive model that can be estimated based on consensus weights $\beta_{n,l}$ that can be defined and/or adjusted by consensus component 402 can constitute a consensus global model parameter of the predictive model.

Figure 5:
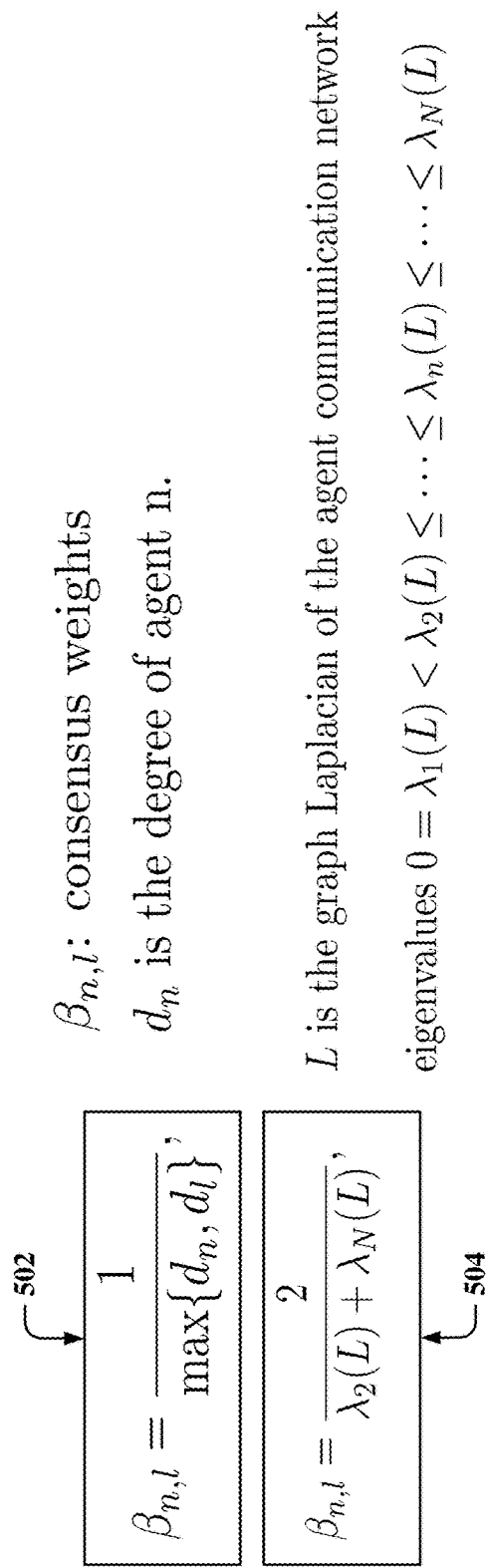
FIG. 5 illustrates example, non-limiting information that can facilitate data protection distributed learning in accordance with one or more embodiments described herein.

Consensus component 402 can employ equation 502 and/or equation 504 depicted in FIG. 5 to define and/or adjust consensus weights $\beta$ corresponding to one or more agents of a multi-agent network. In some embodiments, consensus component 402 can employ equation 502 and/or equation 504 depicted in FIG. 5 to customize (e.g., define and/or adjust) consensus weights β (e.g., consensus weights $β_{n,l}$ described above) corresponding to one or more agents (e.g., agents 202) of a multi-agent network (e.g., a distributed learning network such as, for instance, system 200). For example, consensus component 402 can employ equation 502 and/or equation 504 depicted in FIG. 5 to customize (e.g., define and/or adjust) consensus weights β based on, for instance: a) the consensus protocol that can be implemented by data protection distributed learning system 102 and/or consensus component 402; b) the learning task at hand (e.g., classification, regression, clustering, etc.); and/or c) the dataset (e.g., images, time-series, etc.) used by agents (e.g., agents 202) of a multi-agent network (e.g., a distributed learning network such as, for instance, system 200).

In some embodiments, data protection distributed learning system 102 can facilitate performing such consensus (e.g., via consensus component 402) by implementing one or more communication protocols between agents of a multi-agent network (e.g., a distributed learning network). For example, data protection distributed learning system 102 can facilitate performing such consensus (e.g., via consensus component 402) by implementing one or more communication protocols (e.g., via communication links 204) including, but not limited to, a neighborhood message exchange protocol, a gossip protocol, and/or another communication protocol between agents (e.g., agents 202) of a multi-agent network (e.g., a distributed learning network such as, for instance, system 200).

FIG. 5 illustrates example, non-limiting information 500 that can facilitate data protection distributed learning in accordance with one or more embodiments described herein. Repetitive description of like elements and/or processes employed in various embodiments described herein is omitted for sake of brevity.

As described above with reference to FIG. 4, consensus component 402 can employ equation 502 and/or equation 504 to define and/or adjust consensus weights β (e.g., consensus weights $β_{n,l}$ described above) corresponding to one or more agents (e.g., agents 202) of a multi-agent network (e.g., a distributed learning network such as, for instance, system 200). For example, consensus component 402 can employ equation 502 depicted in FIG. 5 to define and/or adjust consensus weights $β_{n,l}$ corresponding to agent n and agent l based on the degree of each agent, where agent l can comprise one of the one or more neighbor agents described above. In another example, consensus component 402 can employ equation 504 depicted in FIG. 5 to define and/or adjust consensus weights $β_{n,l}$ corresponding to agent n and agent l based on the graph Laplacian of the agent communication network (e.g., a distributed learning network such as, for instance, system 200).

Data protection distributed learning system 102 can be associated with various technologies. For example, data protection distributed learning system 102 can be associated with multi-agent network technologies, distributed machine learning technologies, artificial intelligence technologies, machine learning technologies, stochastic gradient descent (SGD) technologies, synchronous stochastic gradient descent (SSGD) technologies, asynchronous stochastic gradient descent (ASGD) technologies, data analytics technologies, predictive model technologies, decision-making technologies, data protection compliance technologies, computer technologies, server technologies, information technology (IT) technologies, cloud computing technologies, internet-of-things (IoT) technologies (e.g., indoor positioning and navigation), automation technologies blockchain technologies (e.g., smart contracts), energy technologies (e.g., state estimation in power grid), weather technologies (e.g., spatiotemporal environment monitoring for agriculture/livestock), transportation technologies (e.g., connected vehicular network for traffic balancing & accident aversion), robotics technologies (e.g., collaborative target tracking), healthcare technologies (e.g., shared decision making in care provider network), social network technologies (e.g., belief-propagation & diffusion), and/or other technologies.

Data protection distributed learning system 102 can provide technical improvements to systems, devices, components, operational steps, and/or processing steps associated with the various technologies identified above. For example, data protection distributed learning system 102 can automatically: employ an agent to compute local model parameters of a predictive model based on data of the agent; and/or employ the agent to estimate a global model parameter of the predictive model based on the local model parameters and model parameters of one or more neighbor agents. Data protection distributed learning system 102 can thereby enable knowledge integration without actual data-sharing, thus providing data protection of such data of the agent. In sharing only model parameters (e.g., local model parameters, global model parameters) data protection distributed learning system 102 can facilitate and/or provide: a) reduced computation and communication overload (e.g., via reducing the large communication overhead at a fusion center especially when deployed over a large geographical area); b) improved prediction performance; c) robustness to failures and/or attacks; d) scalability to large datasets; e) and/or extension to growing size of a network.

As described herein in accordance with one or more embodiments of the subject disclosure, data protection distributed learning system 102 can provide a distributed framework for predictive models comprising a multi-agent network of local predictors, where each of the local predictors have access to local data only and can exchange its own model parameters (not data) with its neighboring predictors. By doing so the local predictors can estimate, detect, and/or predict the global target variables and/or state. By implementing model design, communication protocols, and/or update rules, data protection distributed learning system 102 can ensure that the predictors come to a consensus asymptotically and perform better than any individual local predictor working on its own. In addition to invoking development of underlying distributed learning algorithms and engineering customized network architectures with smart nodes, data protection distributed learning system 102 can also scale and/or speed up an AI task by providing a parallel data processing solution.

Data protection distributed learning system 102 has the following key advantages over centralized and/or decentralized solutions: a) robustness to link or node failures—if an agent does not receive the parameter estimates from its neighbors then it adapts the consensus weights to update its global parameter estimate accordingly; b) safety from attacks on a central processor, hence from system-wide failures—if any of the agents in the network is under attack, then it can be shut down while the rest continue working as usual and when the node under attack becomes safe, it can be put back in to the network; and/or c) each agent relies on local communication among neighbors which is cheap and fast, hence extending the battery life of such agent and/or neighboring agents.

Data protection distributed learning system 102 can provide technical improvements to a processing unit (e.g., processor 106) associated with a classical computing device and/or a quantum computing device (e.g., a quantum processor, quantum hardware, superconducting circuit, etc.). For example, by facilitating and/or providing reduced computation and communication overload (e.g., via reducing the large communication overhead at a fusion center especially when deployed over a large geographical area), improved prediction performance, and/or robustness to failures and/or attacks as described above, data protection distributed learning system 102 can thereby provide technical improvements to a processing unit (e.g., processor 106) associated with data protection distributed learning system 102. For example, data protection distributed learning system 102 can thereby facilitate and/or provide reduced computation costs, as well as improved performance, accuracy, and/or efficiency of such a processing unit (e.g., processor 106) associated with data protection distributed learning system 102.

Data protection distributed learning system 102 can employ hardware or software to solve problems that are highly technical in nature, that are not abstract and that cannot be performed as a set of mental acts by a human. In some embodiments, some of the processes described herein can be performed by one or more specialized computers (e.g., one or more specialized processing units, a specialized quantum computer, etc.) for carrying out defined tasks related to the various technologies identified above. In some embodiments, data protection distributed learning system 102 and/or components thereof, can be employed to solve new problems that arise through advancements in technologies mentioned above, employment of quantum computing systems, cloud computing systems, computer architecture, and/or another technology.

It is to be appreciated that data protection distributed learning system 102 can utilize various combinations of electrical components, mechanical components, and circuitry that cannot be replicated in the mind of a human or performed by a human, as the various operations that can be executed by data protection distributed learning system 102 and/or components thereof as described herein are operations that are greater than the capability of a human mind. For instance, the amount of data processed, the speed of processing such data, or the types of data processed by data protection distributed learning system 102 over a certain period of time can be greater, faster, or different than the amount, speed, or data type that can be processed by a human mind over the same period of time.

Data protection distributed learning system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that data protection distributed learning system 102 can include information that is impossible to obtain manually by an entity, such as a human user. For example, the type, amount, or variety of information included in data protection distributed learning system 102, local parameter component 108, global parameter component 110, system 200, and/or consensus component 402 can be more complex than information obtained manually by a human user.

Figure 6:
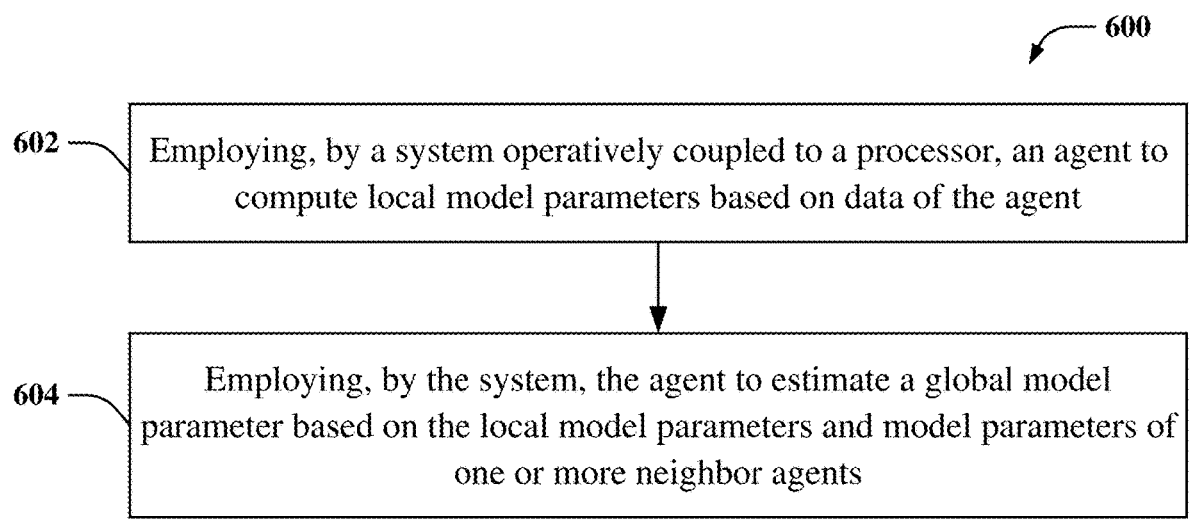
FIG. 6 illustrates a flow diagram of an example, non-limiting computer-implemented method that can facilitate data protection distributed learning in accordance with one or more embodiments described herein.

FIG. 6 illustrates a flow diagram of an example, non-limiting computer-implemented method 600 that can facilitate data protection distributed learning in accordance with one or more embodiments described herein. Repetitive description of like elements and/or processes employed in respective embodiments is omitted for sake of brevity.

In some embodiments, at 602, computer-implemented method 600 can comprise employing, by a system (e.g., data protection distributed learning system 102 and/or local parameter component 108) operatively coupled to a processor (e.g., processor 106), an agent (e.g., agent n of agents 202) to compute local model parameters (e.g., gradient weights, compressed gradient weights, etc.) based on data of the agent (e.g., data stored on an RAD of agent n illustrated in FIG. 2).

In some embodiments, at 604, computer-implemented method 600 can comprise employing, by the system (e.g., data protection distributed learning system 102 and/or global parameter component 110), the agent to estimate a global model parameter (e.g., global target variable(s) and/or state) based on the local model parameters and model parameters of one or more neighbor agents (e.g., agent 1, 2, 3, and/or agent N illustrated in FIG. 2). In some embodiments, such model parameters can comprise at least one of: second local model parameters computed based on second data of the one or more neighbor agents (e.g., data stored on an RAD of agent 1, 2, 3, and/or agent N illustrated in FIG. 2); or a second global model parameter estimated based on the local model parameters, the second local model parameters, and the global model parameter.

Figure 7:
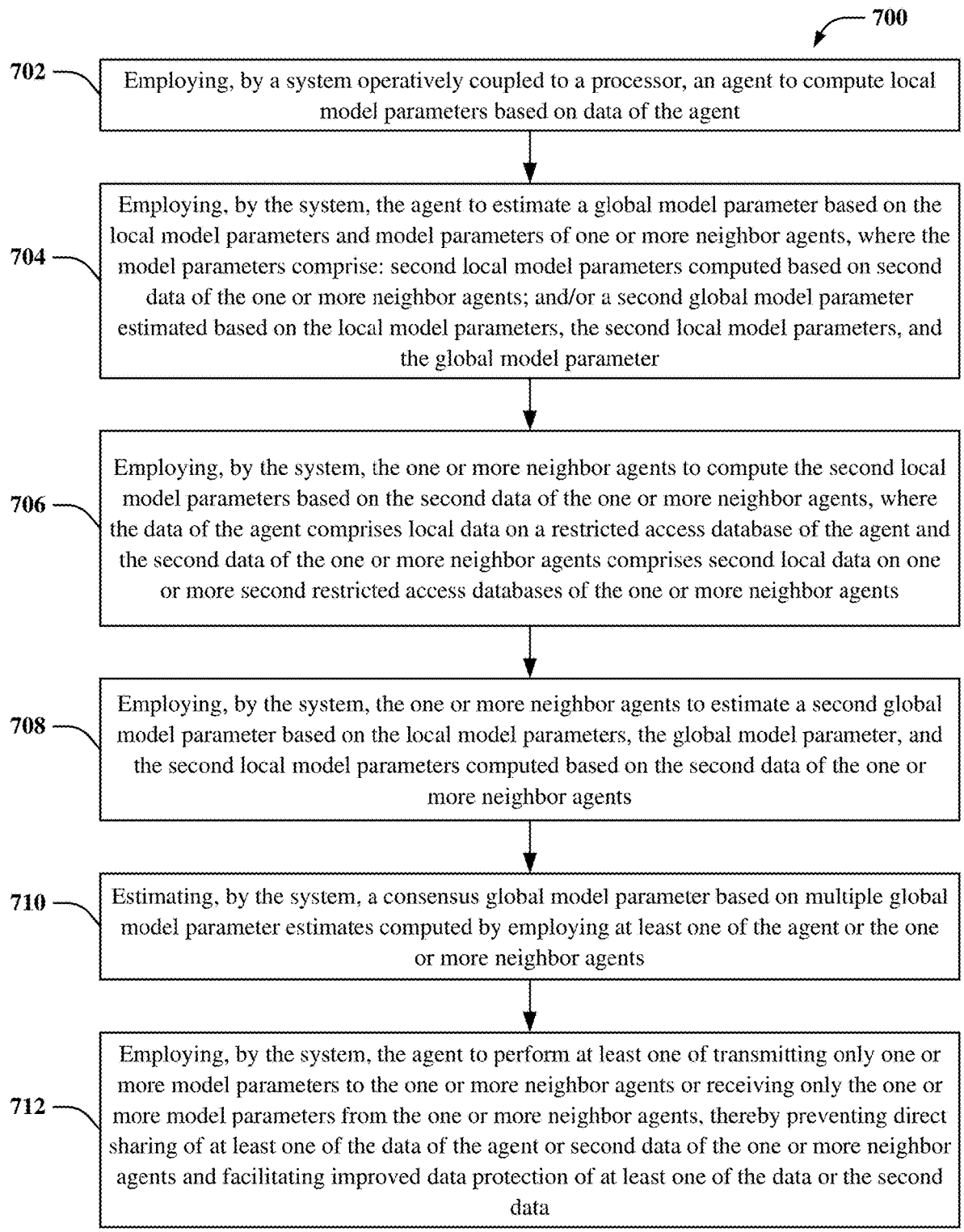
FIG. 7 illustrates a flow diagram of an example, non-limiting computer-implemented method that can facilitate data protection distributed learning in accordance with one or more embodiments described herein.

FIG. 7 illustrates a flow diagram of an example, non-limiting computer-implemented method 700 that can facilitate data protection distributed learning in accordance with one or more embodiments described herein. Repetitive description of like elements and/or processes employed in respective embodiments is omitted for sake of brevity.

In some embodiments, at 702, computer-implemented method 700 can comprise employing, by a system (e.g., data protection distributed learning system 102 and/or local parameter component 108) operatively coupled to a processor (e.g., processor 106), an agent (e.g., agent n of agents 202) to compute local model parameters (e.g., gradient weights, compressed gradient weights, etc.) based on data of the agent (e.g., data stored on an RAD of agent n illustrated in FIG. 2).

In some embodiments, at 704, computer-implemented method 700 can comprise employing, by the system (e.g., data protection distributed learning system 102 and/or global parameter component 110), the agent to estimate a global model parameter (e.g., global target variable(s) and/or state) based on the local model parameters and model parameters of one or more neighbor agents (e.g., agent 1, 2, 3, and/or agent N illustrated in FIG. 2), where such model parameters can comprise: second local model parameters computed based on second data of the one or more neighbor agents (e.g., data stored on an RAD of agent 1, 2, 3, and/or agent N illustrated in FIG. 2); and/or a second global model parameter estimated based on the local model parameters, the second local model parameters, and the global model parameter.

In some embodiments, at 706, computer-implemented method 700 can comprise employing, by the system (e.g., data protection distributed learning system 102 and/or local parameter component 108), the one or more neighbor agents to compute the second local model parameters based on the second data of the one or more neighbor agents, where such data of the agent can comprise local data on a restricted access database of the agent (e.g., data stored on an RAD of agent n illustrated in FIG. 2) and the second data of the one or more neighbor agents can comprise second local data on one or more second restricted access databases of the one or more neighbor agents (e.g., data stored on an RAD of agent 1, 2, 3, and/or agent N illustrated in FIG. 2).

In some embodiments, at 708, computer-implemented method 700 can comprise employing, by the system (e.g., data protection distributed learning system 102 and/or global parameter component 110), the one or more neighbor agents to estimate a second global model parameter based on the local model parameters, the global model parameter, and the second local model parameters computed based on the second data of the one or more neighbor agents.

In some embodiments, at 710, computer-implemented method 700 can comprise estimating, by the system (e.g., data protection distributed learning system 102 and/or consensus component 402), a consensus global model parameter based on multiple global model parameter estimates computed by employing at least one of the agent or the one or more neighbor agents.

In some embodiments, at 712, computer-implemented method 700 can comprise employing, by the system (e.g., data protection distributed learning system 102, local parameter component 108, global parameter component 110, etc.), the agent to perform at least one of transmitting (e.g., via an API of the agent and/or communication links 204 as illustrated in FIG. 2) only one or more model parameters to the one or more neighbor agents or receiving (e.g., via an API of the agent and/or communication links 204 as illustrated in FIG. 2) only the one or more model parameters from the one or more neighbor agents, thereby preventing direct sharing of at least one of the data of the agent or second data of the one or more neighbor agents and facilitating improved data protection of at least one of the data or the second data.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
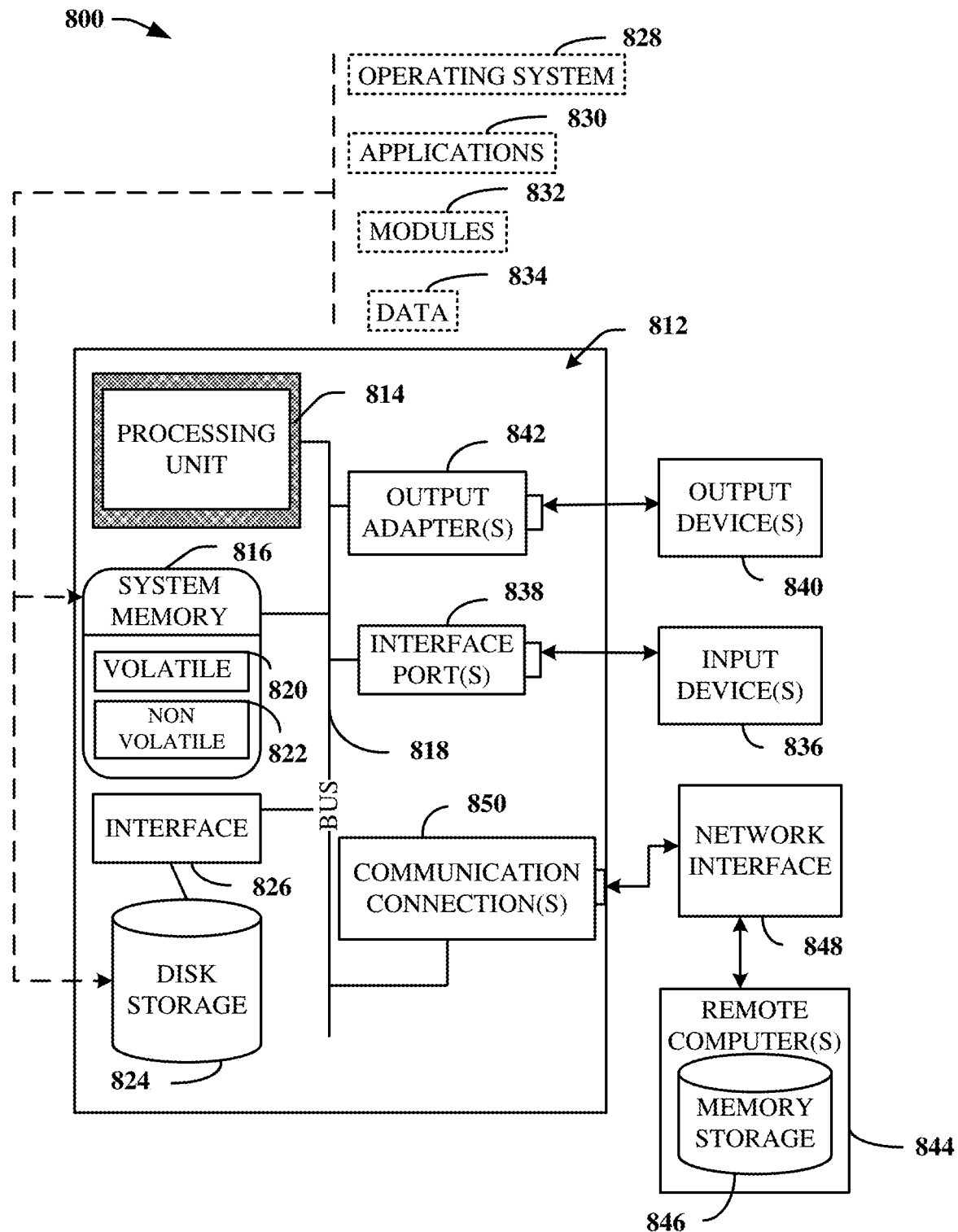
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
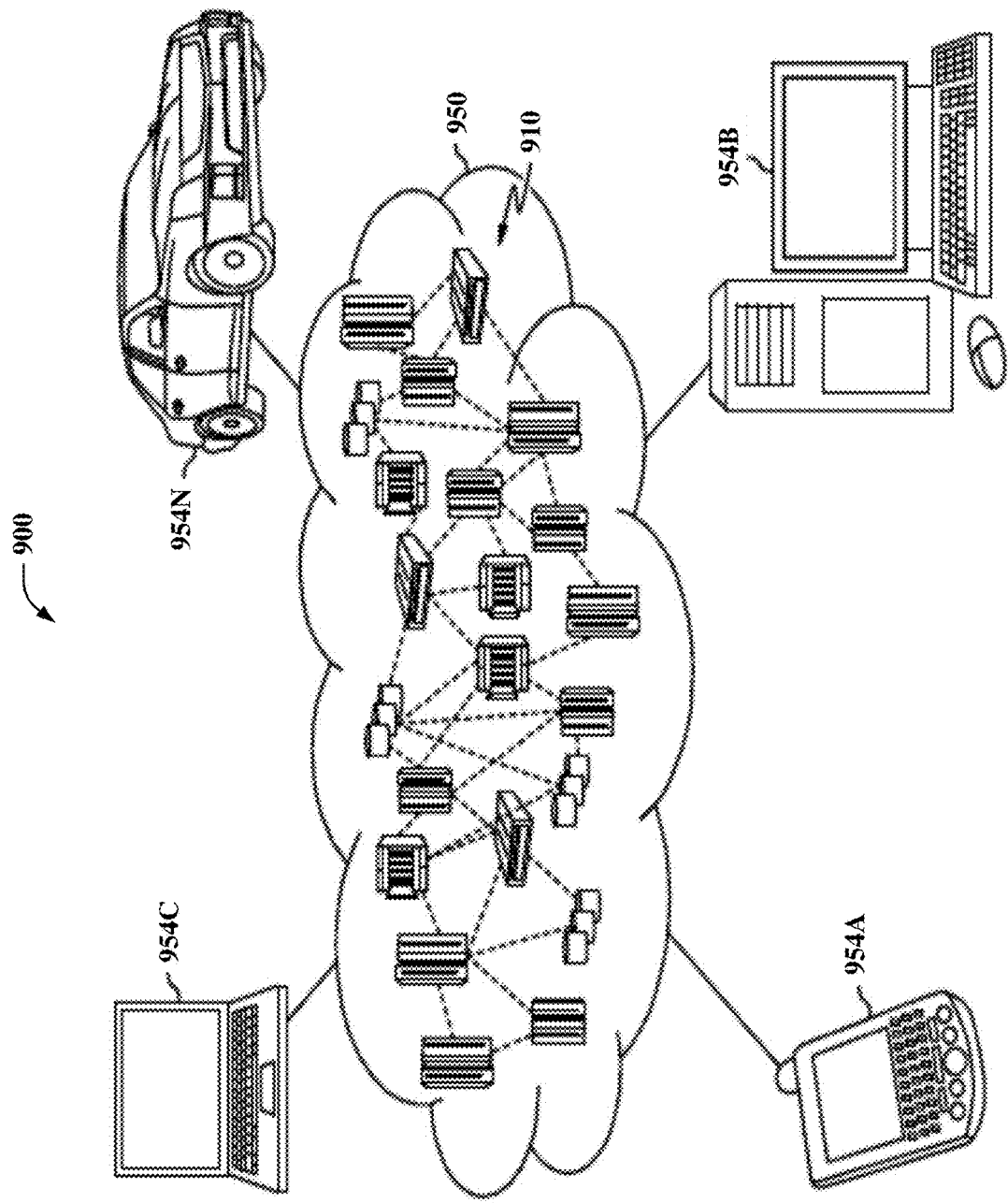
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
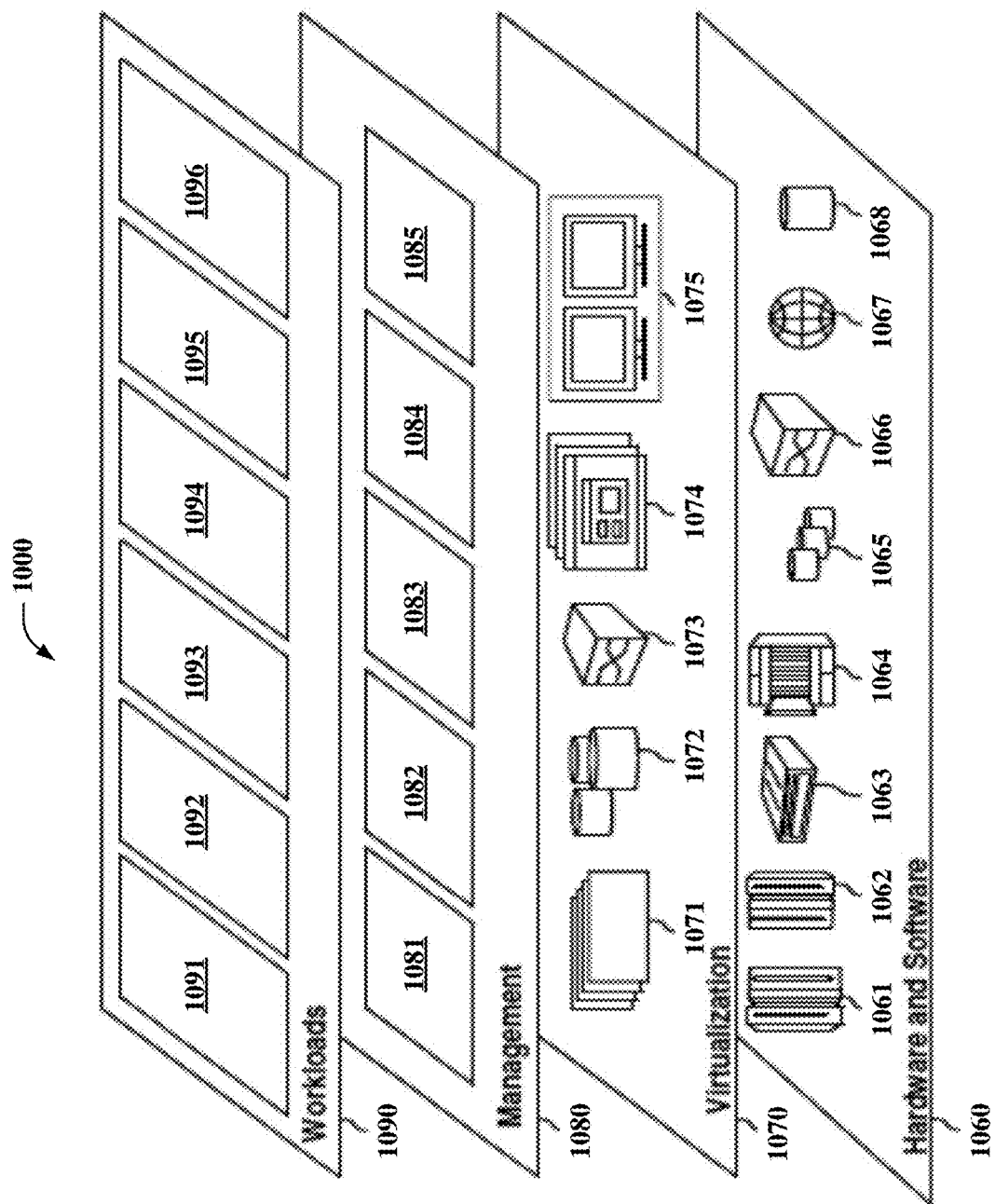
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and data protection distributed learning software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, python, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   a local parameter component that employs an agent to compute local model parameters based on data of the agent; and
   a global parameter component that employs the agent to estimate a global model parameter based on the local model parameters and model parameters of one or more neighbor agents.

2. The system of claim 1, wherein the model parameters comprise at least one of:
   second local model parameters computed based on second data of the one or more neighbor agents; or a second global model parameter estimated based on the local model parameters, the second local model parameters, and the global model parameter.

3. The system of claim 1, wherein the local parameter component employs the one or more neighbor agents to compute second local model parameters based on second data of the one or more neighbor agents.

4. The system of claim 3, wherein the data of the agent comprises local data on a restricted access database of the agent and the second data of the one or more neighbor agents comprises second local data on one or more second restricted access databases of the one or more neighbor agents.

5. The system of claim 1, wherein the global parameter component employs the one or more neighbor agents to estimate a second global model parameter based on the local model parameters, the global model parameter, and second local model parameters computed based on second data of the one or more neighbor agents.

6. The system of claim 1, wherein the computer executable components further comprise:
a consensus component that estimates a consensus global model parameter based on multiple global model parameter estimates computed by the global parameter component by employing at least one of the agent or the one or more neighbor agents.

7. The system of claim 1, wherein the agent performs at least one of transmitting only one or more model parameters to the one or more neighbor agents or receiving only the one or more model parameters from the one or more neighbor agents, thereby preventing direct sharing of at least one of the data of the agent or second data of the one or more neighbor agents and facilitating improved data protection of at least one of the data or the second data.

8. A computer-implemented method, comprising:
employing, by a system operatively coupled to a processor, an agent to compute local model parameters based on data of the agent; and
employing, by the system, the agent to estimate a global model parameter based on the local model parameters and model parameters of one or more neighbor agents.

9. The computer-implemented method of claim 8, wherein the model parameters comprise at least one of:
second local model parameters computed based on second data of the one or more neighbor agents; or
a second global model parameter estimated based on the local model parameters, the second local model parameters, and the global model parameter.

10. The computer-implemented method of claim 8, further comprising:
employing, by the system, the one or more neighbor agents to compute second local model parameters based on second data of the one or more neighbor agents.

11. The computer-implemented method of claim 10, wherein the data of the agent comprises local data on a restricted access database of the agent and the second data of the one or more neighbor agents comprises second local data on one or more second restricted access databases of the one or more neighbor agents.

12. The computer-implemented method of claim 8, further comprising:
employing, by the system, the one or more neighbor agents to estimate a second global model parameter based on the local model parameters, the global model parameter, and second local model parameters computed based on second data of the one or more neighbor agents.

13. The computer-implemented method of claim 8, further comprising:
estimating, by the system, a consensus global model parameter based on multiple global model parameter estimates computed by employing at least one of the agent or the one or more neighbor agents.

14. The computer-implemented method of claim 8, further comprising:
employing, by the system, the agent to perform at least one of transmitting only one or more model parameters to the one or more neighbor agents or receiving only the one or more model parameters from the one or more neighbor agents, thereby preventing direct sharing of at least one of the data of the agent or second data of the one or more neighbor agents and facilitating improved data protection of at least one of the data or the second data.

15. A non-transitory computer program product facilitating data protection distributed learning, the computer program product comprising a computer readable storage medium having program instructions embodied therewith, the program instructions executable by a processor to cause the processor to:
employ, by the processor, an agent to compute local model parameters based on data of the agent; and
employ, by the processor, the agent to estimate a global model parameter based on the local model parameters and model parameters of one or more neighbor agents.

16. The non-transitory computer program product of claim 15, wherein the model parameters comprise at least one of:
second local model parameters computed based on second data of the one or more neighbor agents; or
a second global model parameter estimated based on the local model parameters, the second local model parameters, and the global model parameter.

17. The non-transitory computer program product of claim 15, wherein the program instructions are further executable by the processor to cause the processor to:
employ, by the processor, the one or more neighbor agents to compute second local model parameters based on second data of the one or more neighbor agents.

18. The non-transitory computer program product of claim 17, wherein the data of the agent comprises local data on a restricted access database of the agent and the second data of the one or more neighbor agents comprises second local data on one or more second restricted access databases of the one or more neighbor agents.

19. The non-transitory computer program product of claim 15, wherein the program instructions are further executable by the processor to cause the processor to:
employ, by the processor, the one or more neighbor agents to estimate a second global model parameter based on the local model parameters, the global model parameter, and second local model parameters computed based on second data of the one or more neighbor agents.

20. The non-transitory computer program product of claim 15, wherein the program instructions are further executable by the processor to cause the processor to:
estimate, by the processor, a consensus global model parameter based on multiple global model parameter estimates computed by employing at least one of the agent or the one or more neighbor agents.

* * * * *